United States Patent [19]

Woods

[11] 4,114,370

[45] Sep. 19, 1978

[54] EXHAUST GAS RECIRCULATION MEANS

[75] Inventor: Claude A. Woods, Fairacres, N. Mex.

[73] Assignee: Woods Enterprises, Inc., Las Cruces, N. Mex.

[21] Appl. No.: 757,244

[22] Filed: Jan. 6, 1977

Related U.S. Application Data

[63] Continuation of Ser. No. 689,805, May 25, 1976, abandoned, which is a continuation-in-part of Ser. No. 557,882, Mar. 12, 1975, abandoned.

[51] Int. Cl.[2] ...................... F02M 25/06; F02B 75/10; F01N 3/02; B01D 45/18

[52] U.S. Cl. ........................................ 60/279; 60/311; 55/392; 55/398; 55/DIG. 30

[58] Field of Search ................. 60/274, 279, 278, 311, 60/39.52; 55/461, 392, DIG. 30, 393, 394, 398, 444; 123/119 A; 110/49 R

[56] References Cited

U.S. PATENT DOCUMENTS

| | | | |
|---|---|---|---|
| 619,207 | 2/1899 | Musnicki | 55/394 |
| 789,049 | 5/1905 | Middleton | 55/461 |
| 1,593,102 | 7/1926 | Regnier | 110/49 R |
| 3,320,729 | 5/1967 | Stahl | 55/461 |
| 3,402,551 | 9/1968 | Mendez | 60/311 |
| 3,754,399 | 8/1973 | Ono et al. | 60/311 |
| 3,802,191 | 4/1974 | Fox | 60/279 |
| 3,831,377 | 8/1974 | Morin | 60/274 |
| 3,861,142 | 1/1975 | Bose | 60/274 |
| 3,935,824 | 2/1976 | Gibeault | 110/49 R |
| 3,957,467 | 5/1976 | Kim | 55/DIG. 30 |

FOREIGN PATENT DOCUMENTS

| | | | |
|---|---|---|---|
| 570,578 | 7/1945 | United Kingdom | 55/394 |

*Primary Examiner*—Carlton R. Croyle
*Assistant Examiner*—Thomas I. Ross
*Attorney, Agent, or Firm*—Cushman, Darby & Cushman

[57] ABSTRACT

A apparatus for decreasing fuel consumption of and noxious emissions from an internal combustion engine. Exhaust gases from the engine exhaust are passed through a static structure dual 90° band pipe section to a selective sampler, wherein certain species are removed from the exhaust stream and the bulk of the gases pass through and exit the exhaust system. The removed species are recirculated back to the engine intake system to provide a reconstituted charge, and any liquids removed from the recirculatory lines are vaporized and also fed into the intake system. The sampler includes a number of pipes having louvers therein cooperating with the interior of a pipe section connected to the static structure.

9 Claims, 12 Drawing Figures

EXHAUST GAS RECIRCULATION MEANS

CROSS REFERENCE TO RELATED APPLICATIONS

This is a continuation, of application Ser. No. 689,805, filed May 25, 1976, now abandoned, which is a continuation-in-part of Ser. No. 557,882 filed 3/12/75, now abandoned.

BACKGROUND AND SUMMARY OF THE INVENTION

The invention relates to a method and apparatus for decreasing fuel consumption of internal combustion engines while simultaneously reducing the amounts of noxious materials emitted thereby, and a new engine resulting from utilization of the apparatus according to the invention.

There have been numerous prior art attempts to reduce noxious materials emitted by internal combustion engines, and to decrease the fuel consumption thereof, but to date no entirely successful commercial device has been provided that will simultaneously accomplish both such results. Some prior art devices, such as shown in U.S. Pat. No. 3,100,146 provide a number of cooling and filtration means for acting on exhaust gases for the cleaning up thereof, however, these gases are then merely dispelled into the atmosphere, and do not contribute to increased gas mileage. Other prior art proposals contemplate the recycling of the heavier — see U.S. Pat. No. 3,397,682 for example — or lighter — see U.S. Pat. No. 2,870,758 for example — hydrocarbons in the emissions back into the intake manifold for the purpose of increasing gas mileage, however, both the heavier and the lighter exhaust gases therein are not used, and numerous noxious emissions are still emitted. Other similar systems are shown in U.S. Pat. Nos. 3,224,188, 3,683,626 and 3,730,156. U.S. Pat. No. 3,861,142 utilizes a turbine and other structures to separate exhaust gases in two stages to obtain both light and heavy gases, and then re-combines the gases and circulates them to the air filter. Gas stratification according to this proposal necessitates the use of dynamic structures and a series of separation devices, and can become impractically complicated.

According to the present invention, and improved apparatus requiring no moving parts is provided which results generally in decreased fuel consumption, and emissions from an internal combustion engine.

Apparatus according to the present invention is relatively inexpensive and easy to manufacture, is relatively easy to fit onto existing automobiles, no major changes in the engines thereof being necessary, and provides for the reconstitution of the inducted charge at such pressures and temperatures so that fuel consumption can be decreased. Numerous noxious emissions can be prevented thereby.

It is the primary object of the present invention to provide apparatus for decreasing the fuel consumption and noxious emissions from combustion sources. This and other objects of the invention will become clear from an inspection of the detailed description of the invention, and from the appended claims.

DETAILED DESCRIPTION OF THE INVENTION

Figure 1:
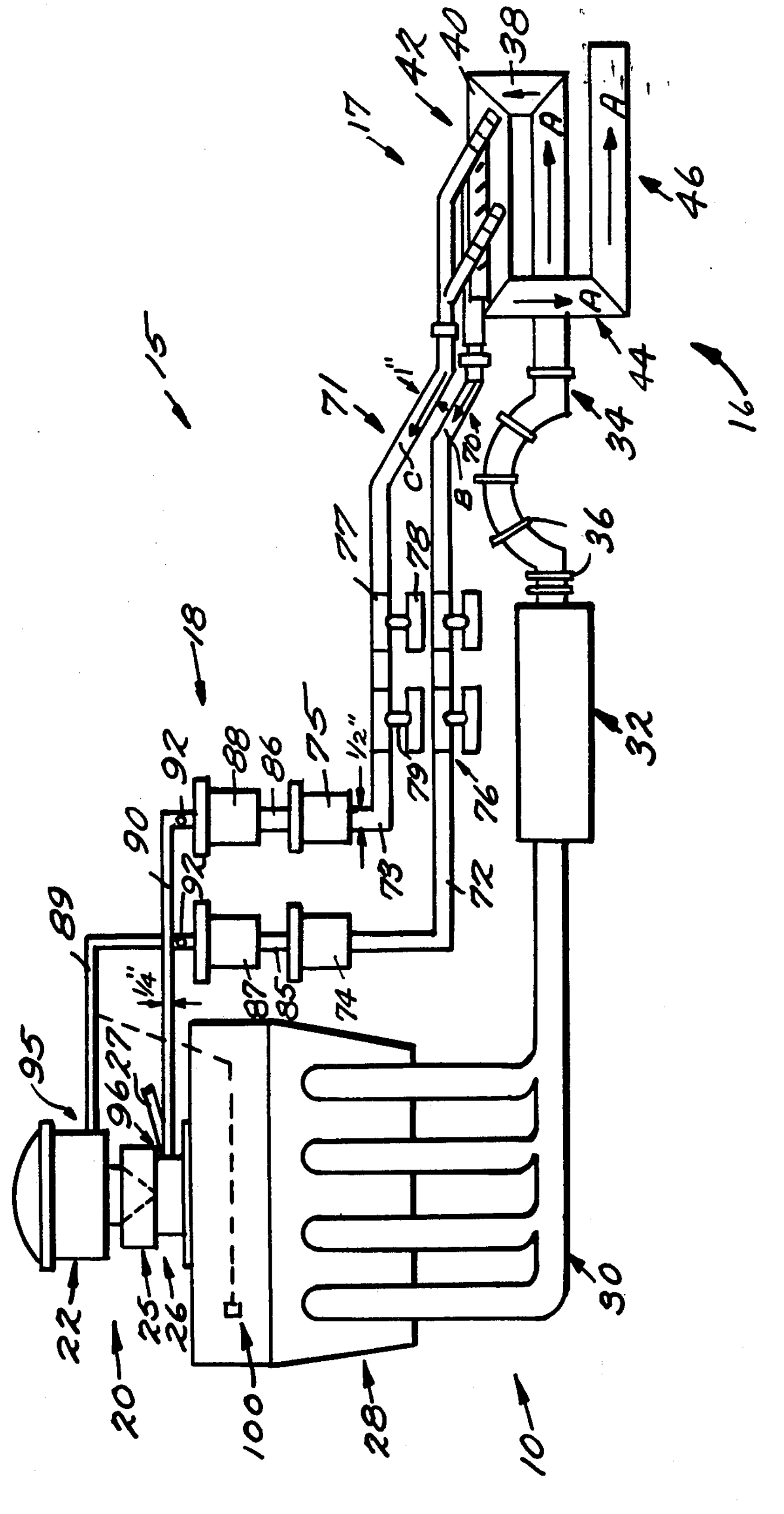
FIG. 1 is a diagrammatic view of an engine utilizing exemplary apparatus according to the present invention.
Figure 2:
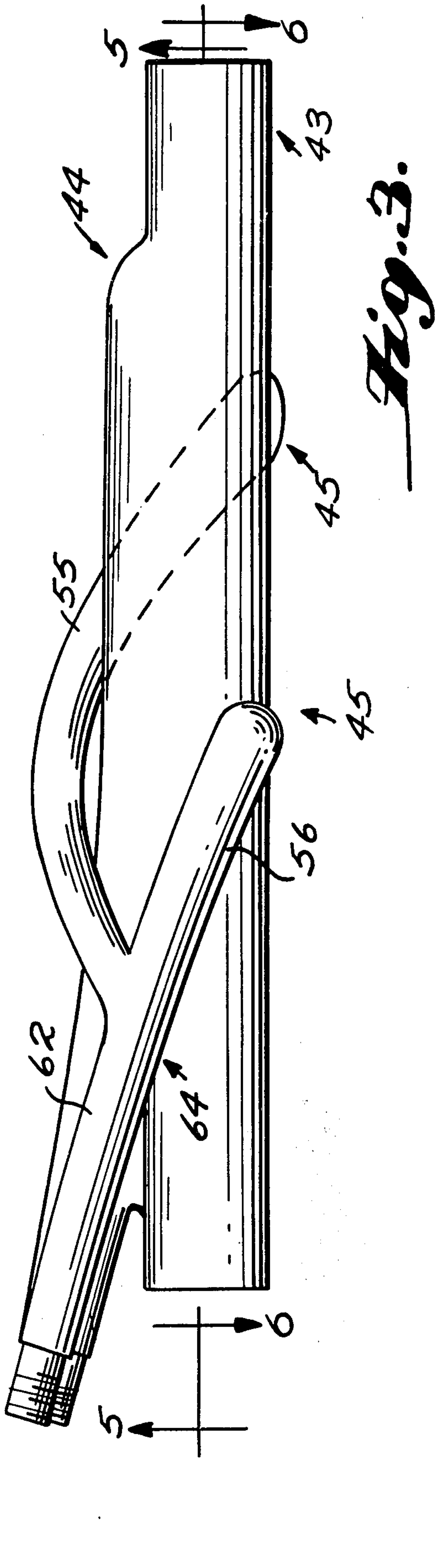
FIG. 2 is a side view of an exemplary separating means according to the present invention.
Figure 3:
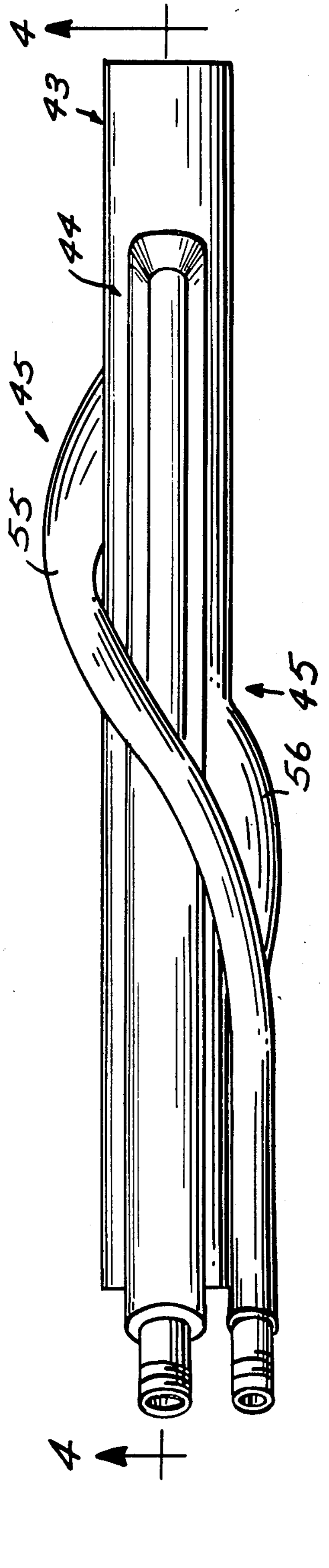
FIG. 3 is a top view of the separating means shown in FIG. 2.
Figure 4:
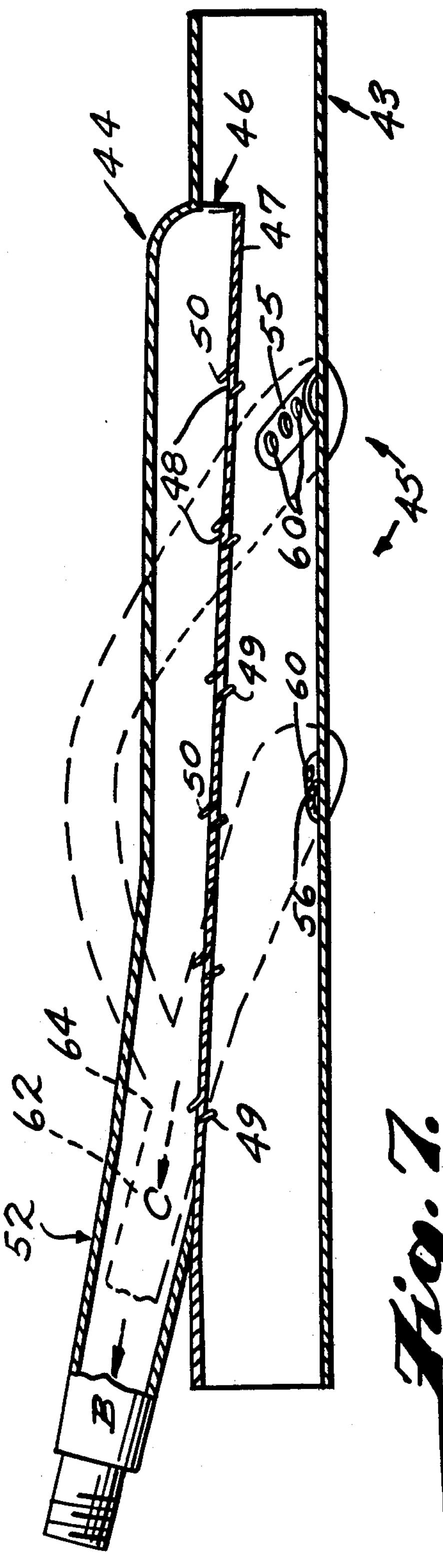
FIG. 4 is a sectional view taken along lines 4—4 of FIG. 3.

An internal combustion engine utilizing apparatus according to the present invention is shown diagrammatically generally at 10 in FIG. 1. The engine 10 is a conventional internal combustion engine, such as an 8-cylinder, 351 cu. inch stock 1972 Cougar engine manufactured by Ford Motor Company, having a carburetion system 20 associated therewith. The carburetion system 20 may comprise an air cleaner 22, carburetor ventura 25, and a carburetor 26 having a raw gas inlet 27 therefor. The system 20 provides a fuel-air mixture for the cylinders within engine block 28. Exhaust manifold 30 is adapted to carry exhaust gases away from the engine block 30, through a muffler 32, for eventual disposal thereof.

According to the teachings of the present invention, means are provided for increasing the fuel economy of an engine 10, and for reducing the noxious emissions therefrom. Said means is shown generally and diagrammatically at 15 in FIG. 1, and generally includes exhaust gas directing and confining means, shown generally at 16, particular gas exhaust selecting means, shown generally at 17, and means for returning particular exhaust gases from the selecting means to the intake (carburetion) system, shown generally at 18.

Exhaust gases from the muffler 32 are confined by pipe means 34 or the like, and are carried away from the exhaust manifold 30 thereby along a first flow path, shown generally at A. During passage of gases through the means 34, cooling thereof will result as a result of heat exchange between the gases and the ambient air through the pipe means 34, which is metal. Cooling fins 36 or the like may be provided on the means 34 to facilitate cooling thereof, and other conventional air cooling chambers, devices or the like may also be employed if desired.

After traversing a path of large enough distance so that a desired amount of cooling takes place, means 37 are provided for redirecting the path A 180°, for instance from a direction away from the intake system 20 back toward the intake system 20 along a portion of the length thereof, while inertially classifying the exhaust gases. Such means may take the form of a pair of right-angle pipe sections 38, 40. The pipe sections 38, 40 in combination with other means to be described hereinafter, may provide sufficient pressure and flow regulation of the selected exhaust gases to be returned to the intake system 20 without the introduction of accessory energy to the exhaust stream being required, to ensure that gases returned to the intake system are effectively filtered, and to allow proper metering of fuel to the engine block 28. During the portion of the path A which is redirected 180°, for instance back toward the carburetion system 20 as shown in the drawings, means 42 or the like are provided for selecting certain of the exhaust gases from the stream for return to the induction (carburetion) system, while the remaining unselected gases are passed through redirecting (right angle) pipe sections 44, 46 preferably outwardly from the vehicle in which the engine block 28 is incorporated, or away from the area of the engine 10 in general when the engine 28 is a stationary engine.

Figure 9:
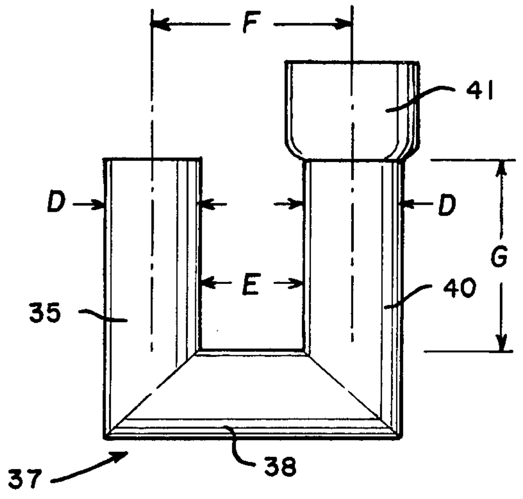
FIG. 9 is a top plan view of an exemplary static structure gas-directing means according to the present invention.
Figure 10:
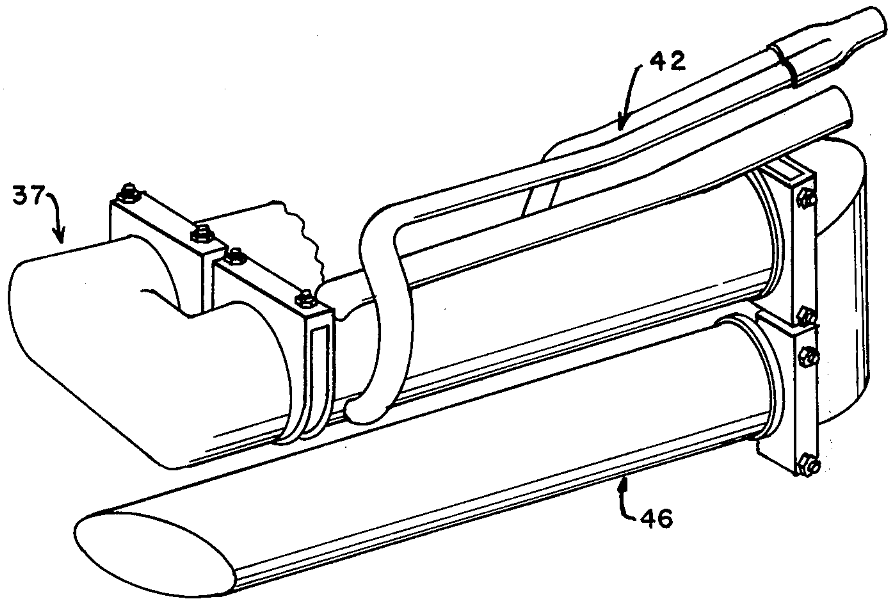
FIG. 10 is a perspective detail view of the means of FIG. 9 and the separating means of FIG. 2 in operative association with each other.
Figure 11:
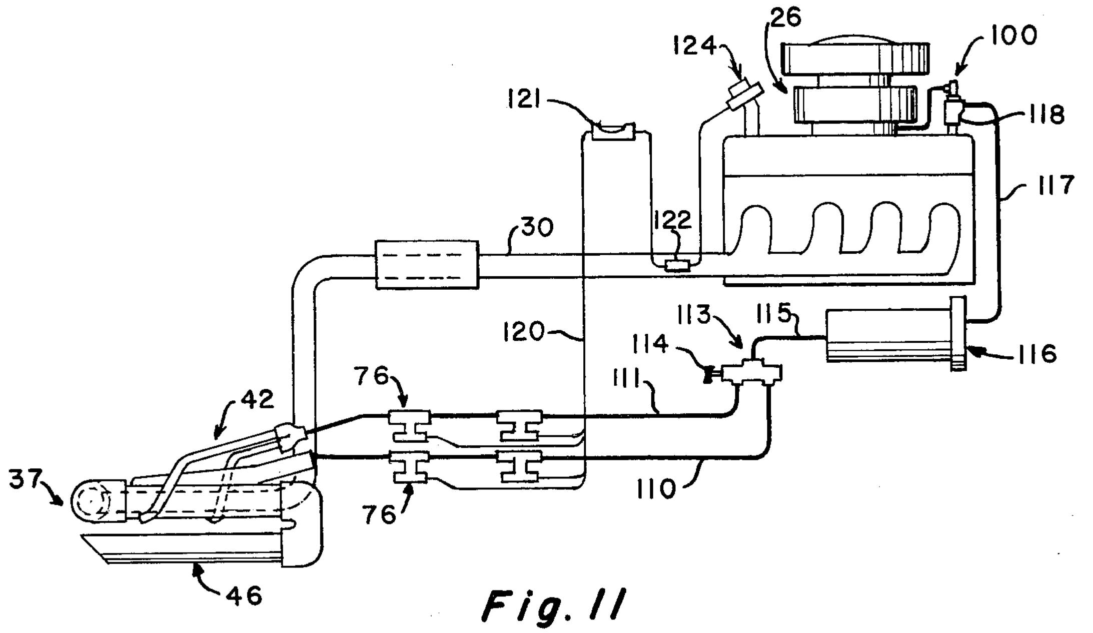
FIG. 11 is a diagrammatic view of a preferred engine system according to the present invention utilizing the apparatus of FIG. 10.
Figure 12:
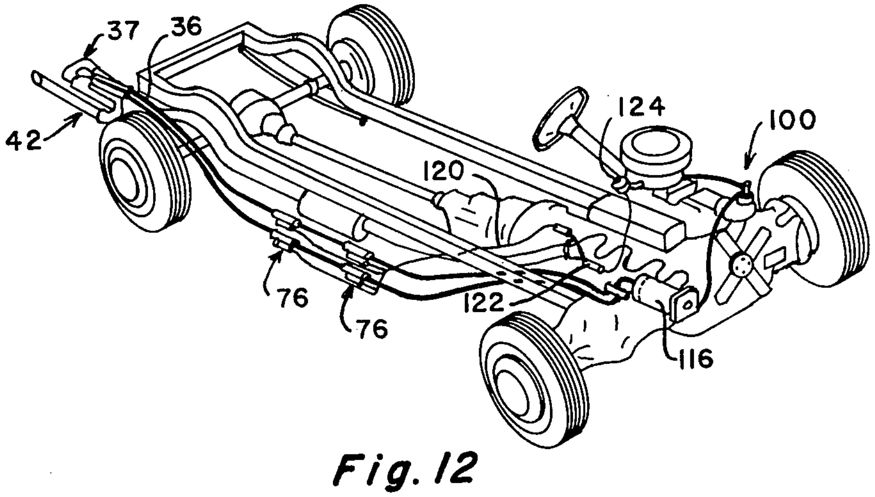
FIG. 12 is a perspective showing of an automobile chasis having the engine system of FIG. 11 associated therewith.

The inertial classification means 37, which is a static structure, is shown in more detail in FIGS. 9–11. The means 37 comprises a first pipe section 35, a second pipe section 38 disposed at 90° with respect to the first pipe section 35 and forming a square elbow therewith, and a third pipe section 40. The third pipe section 40 is parallel to the first pipe section 35 and is disposed at 90° with respect to the second pipe section 38, forming a square elbow therewith. In order to introduce the proper flow components into the gases flowing in the exhaust stream to provide for the desired redirection functions and other associated functions, the pipe sections 35, 38, 40 are of substantially the same diameter D, and the distance F between the centerlines of the first and third pipe sections 35, 40 is about 1–4 times D. With pipe sections 35, 40 of conventional exhaust line diameter (D=1⅞ inches — inside diameter), the distance E between the sections 35 and 40 is about ¾ inch - 1 inch. The pipe sections 35, 40 are disposed in a generally horizontal plane when in use, as shown in FIGS. 10–12. While the apparatus according to the present invention will function to some extent without the pipe sections 35, 40 in a generally horizontal plane, the apparatus functions most effectively to improve fuel mileage and reduce emissions when the plane in which the sections 35, 40 are disposed is between horizontal and ± 10° from horizontal. It is noted also that the distance G of pipe section 40 before connection of the enlarged portion 41 thereof to the skimmer 42 should be chosen to insure that the desired properties of the flow imparted by the means 37 are not diminished. A distance of about 2–4 inches for G has been found to be satisfactory.

The selective sampling means 42 is shown in more detail in FIGS. 2–6 having been shown only diagrammatically in FIG. 1, and are shown in perspective in association with the inertial classification means in FIG. 10. The general function of the sampling means 42 is to select out a portion of gases in the exhaust stream at that point of the flow path A, while allowing the bulk of the gases to pass therethrough. This is preferably accomplished by collection of such selected gases at certain pipe impingement points around the periphery of the exhaust stream.

The selecting means (or selective sampler) 42 is shown in detail in FIGS. 2–6. The selecting means shown in FIGS. 2–6 is an approximate ½ scale representation of a selecting means that has actually been used successfully to improve gas mileage and decrease emissions in a 351 cu. inch 8-cylinder stock engine in a 1972 Cougar (Ford Motor Company) and in other vehicles. The means 42 consists of three general components, a main skimmer body portion 43 comprising a section of exhaust pipe 34 of substantially the same size as the rest of the exhaust system, an upper skimmer portion 44, and a lower skimmer portion 45. The upper skimmer portion 44, as shown in the drawings, consists of a pipe having an internal diameter of approximately 1 inch, said pipe having an open front end 46 thereof disposed within the member 43, and said pipe extending on a slant upwardly from the open end 46. Formed in the bottom wall 47 of portion 44 along the length thereof is engagement with the portion 43 are a plurality of slits or louvers 48, each slit or louver 48 having an inwardly extending edge or blade portion 49 thereof. The portions 50, 49 aid in the selection of the desired gases from the portion 43, and direct the gases upwardly into the interior of the portion 44, the portions 50 providing locally a small partial vacuum at the inner edge of the slot assisting in the drawing of the desired gases from the portion 43 into the portion 44. The size, number, shape and disposition of the slots 48 and edges 49, 50 associated therewith may vary along the length of the portion 44, although it is preferred that an even area of openings be provided along the length of bottom 47. The distance which the open end portion 46 will extend into the interior of the portion 43 may vary depending upon the particular circumstances, as may the dimensions, location, and extent of position of the blades. The portion 52 of member 44 extending away from the portion 43 is arranged to transport gases vertically immediately after exit from portion 43 so as to prevent the formation of condensation right at the selecting means itself, which might clog up slots 48 or otherwise interfere with proper gas selection. The means 37 is directly connected between the conduit 34 and the sampler 42, a linear connection being provided between the static structure third pipe section 35 and the sampler 42, and in fluid communicating relationship with both the conduit 34 and the sampler 42.

As shown in the drawings, the lower skimmer 45 may consist of two pipes, 55, 56, each consisting of tubing approximately ½ inch in diameter. The open ends 57, 58 thereof may be flattened. The pipes 55, 56 are spaced angularly (helically) around the bottom of the member 43 so as to select gases. from other peripheral streams flowing through member 43, and are disposed so as to select from different peripheral streams than the upper skimmer 44. Each member 55, 56 may have one or more slots or louvers 60 formed therein, corresponding generally to the slots 48 formed in the upper skimmer 44. The slots or louvers 60 allow for the passage of gases into the tubes 55, 56 respectively from the gas stream. The pipes 55, 56 are then wrapped around the member 43 after exit from member 43 to join in a single pipe 62, and also are adapted at portion 64 thereof to extend upwardly so as to minimize the chances of a fluid trap forming, which would result in interference with the free flow of gases through the tubes. The "pipes" may be formed integrally as part of the skimmer body portion 43, or welded and glanned thereto.

After certain fractions of the exhaust gas have been separated from the exhaust gas stream A, means are provided for confining the separated gases in other flow paths, separate from the path A. Although it is preferred to join the separated gases together at some point in a metering valve (see FIG. 11) to provide the same second flow path therefor, and to pass them through the same filtering means, a workable arrangement also is provided by confining the upper sample of gases to a third flow path B, while the lower sample of gases are confined to a fourth separate flow path C. Means for confining the upper sample of gases along the path B include a first pipe section 70 extending at an angle vertically upwardly from the separating means 42, and another pipe section 72 leading away from section 70. The pipe section 70 is arranged at an angle and is adapted to provide for upward movement of the gases passing therethrough so as not to provide a fluid trap that might retain condensed fluids and thereby impede the return of the selected gases. Also, conditions in flow paths B and C favor the immediate cooling of the selected gases which facilitates the subsequent condensation of the water and heavy hydrocarbon content thereof. The entrainment of condensed liquid particles subsequently facilitates the removal of all particulates from the selected return gases, either by filtration or impact separation.

Figure 8:
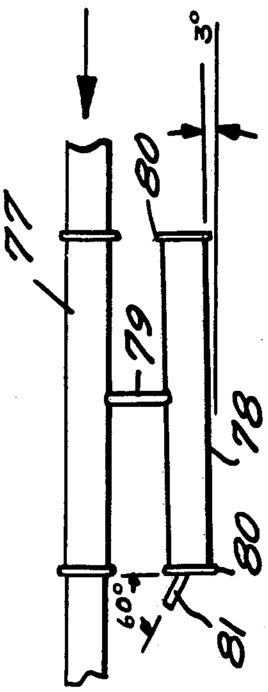
FIG. 8 is a detail diagrammatic view of exemplary ingest segregator means that may be utilized according to the present invention.

Disposed in conduit 72 are preferably provided one or more assemblies 76, hereinafter called ingest segragators or vapor liquid traps. These ingest segregators 76 are designed to collect the excess of liquids and solids as they pass through the line 72, to prolong the lift of the subsequent filter system, to assist in the removal of solids collected, and to assist in controlling and metering the water and other condensibles for engine cylinder cooling and charge modification without allowing depressurization of the assembly 17. Each assembly 76 preferably consists of a main line funnel 77, a reservoir 78, and a tube 79 connecting the funnel 77 and reservoir 78 together. The member 77 may take the form of a tube of metal or other good heat-conducting material, approximately 6–10 inches in length, adapted to permit the passage of gases therethrough without excessive erosion, and for withstanding constant heat application. Aluminum, copper, and brass tubings are suitable for the means 77. The reservoir 78 may take any suitable form for the collection and removal of liquid and solids, but preferably takes the form of a tube of aluminum, brass, copper, or selected plastics, having a cap 80 at each end thereof. Small tubings 81 may be provided in each of the caps 80, each extending from approximately ¼ inch from the top of the cap with an angle downwardly into the reservoir 78 at an angle of from 20°–40° from horizontal [See FIG. 8]. The lower end of the tubing 81 within the reservoir 78 is preferably below the desired fluid level of liquid in the reservoir, but above the level whereat clogging by solid particles is likely to occur. The tubing 81 is in sealed relationship with the cap 80. Cleaning of the reservoir 78 may be accomplished merely by removing a cap 80 and flushing out the contents therefrom.

The nipple 79 connecting the funnel 77 and the reservoir 78 is preferably designed so that when the reservoir 78 is connected thereto, the reservoir will tilt downwardly in the direction of the flow path B approximately 3°, whereby the removal of excess fluids from the reservoir 78 through the tubings 81 is facilitated. While the fluids, etc. from the ingest segregators may be disposed of on the ground, it is preferred that they too be recirculated back to the intake system, through a heat exchanger vaporizer, as shown in FIG. 11, and as more fully described hereinafter.

It is preferred that an identical set of ingest segregator assemblies be provided in the return line 73 for the lower sample of separated exhaust gases.

Upon laboratory testing of the products removed from the reservoirs 78, it has been found that lead (when leaded fuel is used) and sulphur accumulate therein, as well as water. In one analysis, 23.8% of the solid materials collected in one ingest segregator were found to be sulphur, and 1.5% lead. In another analysis of the solids collected in an ingest segregator 4.3% was found to be sulphur, 48% iron, 25 ppm zinc, and 3 ppm lead, with the balance chiefly organic matter. When metal tubing is used for the funnel 77, a temperature drop can be sensed across this part indicating that the ingest segregators are assisting in cooling of the sampled gases.

After exhaust gases are passed through the ingest segregators in lines 72 and 73, respectively, they may be filtered by filtering means 74, 87, and 75, 88 respectively. More filtering components than the two-stages shown in the drawings may be provided if desired. During passage through the filtering means 74, 75, 87, 88, various other solids and liquids are removed besides those already removed in the ingest segregators 76. Carbon, sulphur, and lead are most often removed by the filters. In one laboratory test of materials removed from one of the filters 74, 75, 87, 88, it was found that sulphur constituted 7.6% of the materials, and lead 0.08%. The filters are designed to remove a substantial part of all solids, micronized impurities, and gums which pass therethrough, while allowing gases to pass therethrough. The filter medium also re-atomizes any entrained water and other condensibles to assist in transporting these constituents along with the selected gases to the induction system 20.

Each of the filters 74, 75 may comprise a canister approximately 3–4 inches in length, and approximately 3–3½ inches in diameter, filled with approximately 9 feet of 40–60 gauge wire therein. The wire is of such a material with such a texture so as to withstand erosion and corrosion from the fluids to be passed through the filter. Aluminum wire has been found satisfactory, but other materials are also suitable, such as glass or mineral wool. The wire may be compressed into a roll having a length equal to the diameter of the container. The compression of the medium must be low enough to allow return gases to flow therethrough with low resistance, but tight enough to prevent penetration by most particles of solids and liquids which may otherwise pass therethrough. A preferred location for such filters would be under the intake ventura crankcase of a conventional engine, or in the vicinity of the engine compartment grill, or within the engine compartment in the vicinity of the firewall or air intake, so as to allow easy access thereto for replacement and servicing of the filtering elements, and for the removal of trapped accumulated solids therefrom.

Each of the filters 87, 88 may take a slightly different form than the filters 74, 75. The second filters 87, 88 may be primarily designed for the storage and distribution of the return gases and secondarily for the removal of any excess particles remaining in the return streams. Four or more exit ports may be provided therefor [see FIG. 7], the body of the filter being comprised of a canister much like the one for the filter 74, 75. Approximately 9 feet of 40-60 gauge wire (such as aluminum wire) is wrapped with 60-80 mesh copper screen so as to fit tightly within the canister. Manually adjustable valves 110 may be provided at each of the exit ports.

After discharge from the filters 87, 88, the gases should now be in the desired form for reconstituting the engine intake charge and may be passed to the intake system carburetor assembly 20. Where the circumstances are such that it is anticipated that the gases will still have undesired particles remaining therein after passage through the filters 87, 88, further filtering stages may be provided to facilitate removal thereof. Such a stage may take the form of one or more line atomizers 92 disposed in conduits 89, 90 respectively leading from filters 87, 88 to carburetor system 20. Each line atomizer 92 may take the form of bar stock of the same diameter of the line 89, 90 in which it is disposed, each piece of stock having five to eight indentations of approximately 1/6 inch each in depth extending around the 360° circumference of the bar stock.

To insure that a significant pressure drop does not occur in the system 17 as the exhaust gases are passing through the various filtering means from the separator 42 to the carburetor assembly 20, the various sections of tubing, 72, 85, 89 and 73, 86, 90, may be formed with particular relative diameters. The inside diameters of the conduits (70, 72, and 71, 73) extending from the separating means 42 to the filters 74, 75 may be gradually constantly decreasing. For instance, if the diameter of the tube 70 is 1 inch at its point of connection to the separator 42, it is preferred that it be ½ inch at its connection to filter 74. The tubes 85, 86 are preferably the same diameter as the incoming lines connected thereto, and the tubes extending from the filters 87, 88 are of lesser diameter than the tubes 85, 86 the diameters of the tubes 89, 90 being substantially constant throughout the lengths thereof. For instance, the inside diameter of the tubes 85, 86 could be ½ inch, and the inside diameter of the tubes 89, 90, ¼ inch. In this way, the pressure of the gases introduced into the carburetor assembly 20 is of the workable pressure, with no accessory pressure boosting means being necessary.

As shown in FIG. 1, the gases taken from the upper sample of gases in the separator 42 may be introduced into the induction system carburetor assembly 20 at the air cleaner 22, while the lower sample of gases may be introduced directly to the fuel inlet 27 for the carburetor 26 below the throttle plate. Reference numerals 95 and 96 respectively in FIG. 1 indicate such connections. The pcv valve 100 may have the line 101 leading therefrom in fluid communication with the line 89 for introduction to the intake manifold (air cleaner) as is customary in conventional engines.

Figure 7:
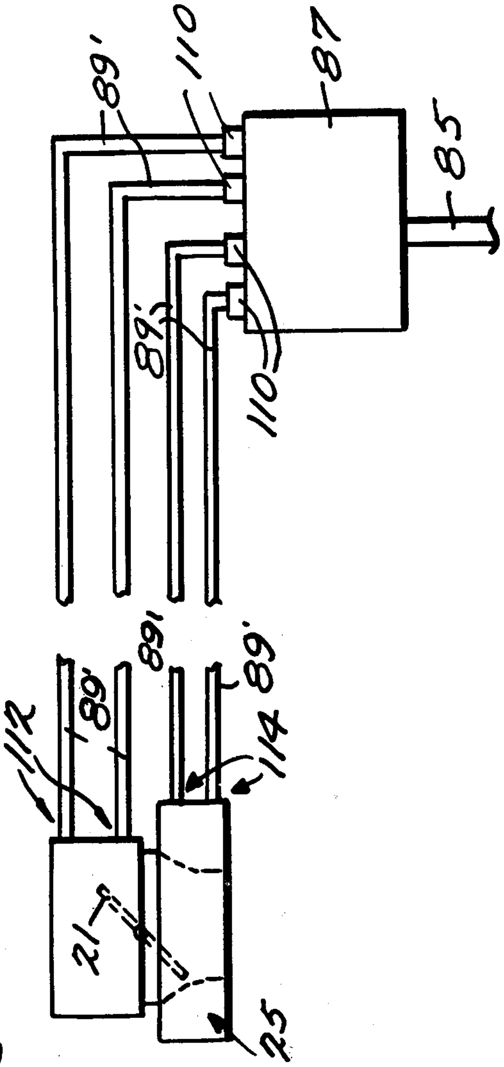
FIG. 7 is a diagrammatic view of a modified form of final filtering means and carburetor connections therefor that may be used according to the present invention.
Figure 5:
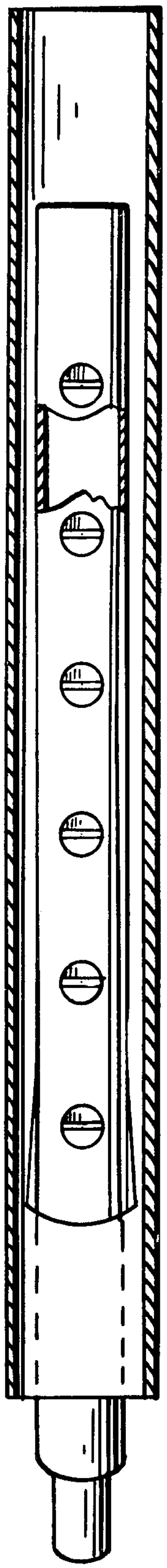
FIG. 5 is a sectional view taken along lines 5—5 of FIG. 2.
Figure 6:
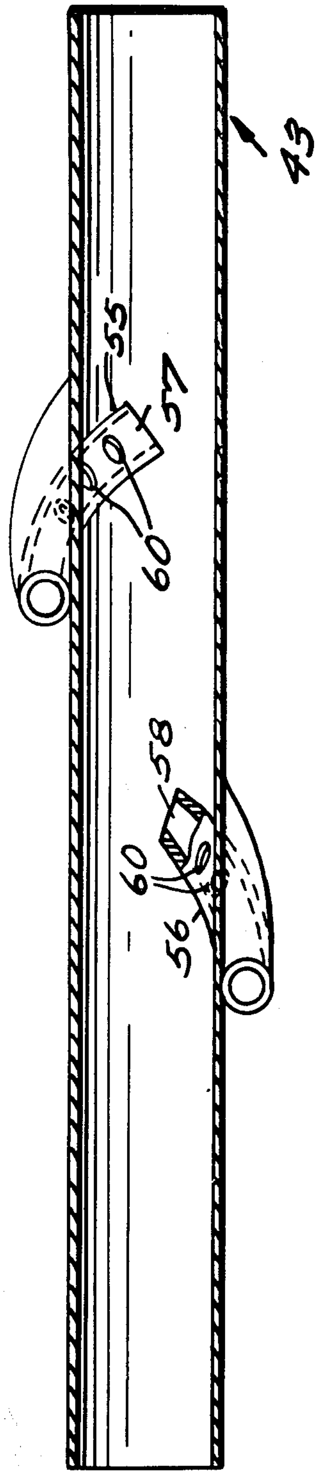
FIG. 6 is a sectional view taken along lines 6—6 of FIG. 2.

It may be desirable to provide one of the second stage filters 87 or 88 with four exit ports, each exit port having a ¼ inch manually adjustable valve 100 associated therewith as shown in FIG. 7. Then two of the exit ports may be connected above the throttle plate 21 of the carburetor, and two below the throttle plate. For conventional commercially available ¼ inch adjustable valves on the market, approximaterly one half to three fourths of one turn from closed for each valve 21, and 2 to 3 ½ turns from closed on the valve affixed to the return lines 89' above the butterfly valve is satisfactory. Such adjustments have been found to supply the flow of return gases to the engine intake manifold that is needed to accomplish the objectives of the present invention.

When utilizing apparatus according to the present invention, several modifications to the normal fuel supply means should be made in order to accomodate the returned exhaust gases so that too much fuel is not introduced to the cylinders at one time. For the 1972 Cougar 351 cu. inch 8 cylinder engine mentioned above, the following adjustments may be made. The inner diameter of the carburetor high speed fuel jets is reduced to approximately 0.32 to 0.42 inch. The power valve in the carburetor is restricted by reducing its orifice inlet from ten to twenty thousanths of an inch, or by completely closing it off. The venturi cluster is restricted by the installation of approximately 60-80 mesh fine mesh screen over the venturi tube. Using a fuel regulator, the fuel presure from the fuel pump is reduced to 2–4 pounds. By lowering the level of the fuel float in the carburetor approximately ⅛, the level of fuel in the carburetor bowl is lowered. The accelerator pump on the carburetor is restricted through the use of a mechanical stop so as to provide assistance in passing dead spots when the engine idles, but otherwise not being operative. Of course, the above steps are only ememplary modifications that may be made, and other changes could be made, or other apparatus provided to insure proper metering of fuel into the cylinders of the engine when using apparatus according to the present invention; namely, to obtain ultra-lean carburetion and reduced fuel rate.

A preferred engine system according to the present invention is shown in FIG. 11. The system of FIG. 11 differs from that of FIG. 1 primarily in the fact that the lines leading from the skimmer 42 are joined at a common filter/storage cannister and the liquid from the vapor liquid traps is recirculated. The return gases are primarily inserted through the pcv valve of the engine intake system, along with any crancase gases. After exhaust gases are inertially classified by passing through the horizontally disposed means 37, the heavier and lighter components are separated by skimmer 42 and are passed through lines 111 and 110 respectively, the lines 110, 111 of nylon or the like. Means for recirculating the exhaust gases include lines 110, 111 and the other lines connected thereto. Vapor liquid traps 76 are disposed in each of the lines 110, 111. The lines 110, 111 are recombined in a manual metering valve 113, having a manually adjustable control portion 114 thereof for metering the amount of fluid from line 111 being combined with the unrestricted flow of fluid from line 110. The position of the metering valve 113 that is chosen will vary from engine to engine and for different circumstances. Any fluid not passing through valve 113 from line 111 will have a tendency to back up in the line and condense and be collected by vapor liquid traps 76.

Once the lines 110 and 111 are combined into a single line 115, that line 115 is passed through a storage container and filter assembly 116. The assembly 116 may contain any suitable medium as previously described with respect to filters 74, 75 and such as 80 porosity foam plastic or other porous mediums. Since some fluids collect in the assembly 116, it is a storage container as well as a filter. From the assembly 116, a line 117 carries the mixture of return gases to an attachment fitting 118 below the conventional pcv valve 100. The pcv valve may be modified so that it is always slightly open in order to facilitate the passage of fluids therethrough. In this way the selected return gases frm skimmer 42 are recirculated to the intake system of the engine.

Rather than disposing of the liquid collected in traps 76, a line 120 may be provided extending from traps 76 back toward the intake system of the engine. The line may pass through a sight gauge 121 — which provides an indication that fluids are flowing therethrough — through a heat exchangeer vaporizer (tube attached to engine exhaust manifold), and back to a conventional EGR valve 124 of the engine intake system or other portion of the engine intake system. The heat exchanger vaporizer 122 obtains heat of vaporization from its surroundings since it is disposed on the exhaust line 30 of the engine, close to the engine block.

The engine that results utilizing the system according to the present invention has many distinctive features, and many advantages over prior art internal combustion engines. Utilizing the system according to the present invention an internal combustion engine is provided having combustion chambers (i.e., cylinders) with working members therein providing a high compression ratio. Despite the high compression ratio, the engine runs on low octane fuel (i.e., 80 octane). Spark plugs are disposed in the combustion chambers, and the means for timing the spark (distributor, solid-state ignition system, etc.) of the plugs operate so that the spark timing is ultra-advanced. For instance in tests run on vehicles incorporating the teachings of the present invention, a wide range of spark timings is satisfactory but best results are obtained with ignition above about 60° BTC (at 65° BTC) at 50 mph and road load. The low octane fuel and air to be supplied to the combustion chambers are mixed by mixing means (carburetor) so that an ultra-lean fuel mixture is provided compared with conventional internal combustion engines (equivalence ratios far below stoichiometric and well below maximum flame temperature).

According to the present invention, the following advantageous results may be achieved (in addition to reduced emissions and increased gas mileage): A longer exhaust system life because of lower exhaust system temperatures. Longer spark plug life or better performance for a given life because of reduced ignition system stress due to improved electrical properties of the charge. Longer valve and ring life and fewer tune-ups because of reduced combustion chamber wall heating and depositions. Reduced cooling system load due to improved cycle efficiency, with potential cost and weight savings because of the reduced cooling system capacity requirements and bulk. Reduced fuel octane requirement (no lead necessary) with subsequent higher petroleum refinery yields. Improved start and warm-up performance due to improved lean-mixture and ignition characteristics. Potential elimination of other emission control measures (e.g., catalytic converters, hot gas EGR, air injection pumps, etc.)

According to a method of utilizing the invention, for achieving the advantageous results according to the invention, an internal combustion engine is operated with a modified combustion chamber charge by selectively sampling certain upper and lower peripheral streams from redirected exhaust gases passing through the exhaust system and returning such filtered gases to the intake system in certain proportions to the fresh fuel/air intake. The central core of the exhaust reduced in noxious gas content is then allowed to exit from the exhaust system. According to the more specific method according to the present invention, the exhaust gases are confined to flow in a first flow path, cooling of said gases taking place while flowing in the first flow path. Then, in a portion of the first flow path, the gases are diverted generally toward the intake system so as to provide sufficient pressure to return a portion of the exhaust gases in the stream to the engine induction (carburetion) system, while they are inertially classified. The separated upper and lower gas samples are then confined in a second flow path extending generally toward said intake system, and liquids and solids are removed therefrom, including lead, carbon, sulphur, water and other condensibles. Then the gases, as well as vaporized water and hydrocarbon volatiles, are introduced into the intake system to reconstitute the combustion chamber charge for improved engine performance.

While the invention has been herein shown and described in what is presently conceived to be the most practical and preferred form of the invention, it will be apparent to one of ordinary skill in the art that many modifications may be made thereof within the scope of the invention, while scope is to be accorded the broadest interpretation of the appended claims so as to encompass all equivalent structures and devices.

What is claimed is:

1. A selective sampler for use in the exhaust system from a combustion chamber, comprising
   - a generally horizontally disposed, generally linear, generally uniform diameter, tubular conduit having an upper skimmer means extending axially thereinto from the top thereof,
   - lower skimmer means extending into the tubular conduit around the bottom thereof,
   - said upper skimmer means comprising a pipe section disposed at an angle with respect to said tubular conduit and having a plurality of louvers formed therein along the length thereof in communication with the interior of said tubular conduit, and
   - said lower skimmer means comprising a pair of pipe sections extending into said interior of said tubular conduit, said pipe sections each having a plurality of louvers formed therein along the length thereof in communication with the interior of said tubular conduit.

2. A sampler as recited in claim 1 wherein said tubular conduit is substantially circular in cross-section.

3. A sampler as recited in claim 1 further comprising tubular solid-walled conduits connected from said upper skimmer means and said lower skimmer means and to the combustion chamber for returning gases selected by said skimmer means to the combustion chamber.

4. An exhaust gas treatment system for a combustion chamber, comprising
   - an exhaust conduit from a combustion chamber,
   - a gas sampler for removing selected gases from the flow of gas from the combustion chamber and returning them to the combustion chamber, while allowing passage of other gas therethrough, said gas sampler including a solid wall tubular member having solid wall tubular passageways extending therefrom for returning removed selected gases to the combustion chamber,
   - a static structure connected between said conduit and said sampler, and consisting of a first pipe section; a second pipe section disposed at substantially 90° with respect to said first pipe section and forming a square elbow therewith; and a third pipe section substantially parallel to said first pipe section and disposed at substantially 90° with respect to said second pipe section and forming a square elbow therewith; said first and third pipe sections disposed in a substantially common plane that is between horizontal and about ± 10° from horizontal, and said static structure being directly connected between said conduit and said sampler, a linear connection being provided between said static structure third pipe section and said sampler, and in fluid-communicating relationship with both said conduit and said sampler.

5. Apparatus as recited in claim 4 wherein said first, second, and third pipe sections are of substantially the same diameter D, and wherein the distance between the centerline of said first pipe section and said third pipe section is substantially 1 to 4 D.

6. Apparatus as recited in claim 4 wherein the distance from the outer periphery of said first pipe section to the outer periphery of said third pipe section at a point thereof closest to said first pipe section is about $\frac{3}{4}$ inch - 1 inch.

7. An exhaust gas treatment system for a combustion chamber comprising an exhaust conduit from a combustion chamber, a gas sampler for removing selected gases from the flow of gas from the combustion chamber and returning them to the combustion chamber, while allowing passage of other gas therethrough, said gas sampler comprising a tubular conduit having an upper skimmer means extending axially thereinto from the top thereof, lower skimmer means extending into the tubular conduit around the bottom thereof, said upper skimmer means comprising a pipe section disposed at an angle with respect to said tubular conduit and having a plurality of louvers formed therein along the length thereof in communication with the interior of said tubular conduit, and said lower skimmer means comprising a pair of pipe sections extending into said interior of said tubular conduit, said pipe sections each having a plurality of louvers formed therein along the length thereof in communication with the interior of said tubular conduit, and a static structure connected directly between said conduit and said sampler and in fluid-conducting relationship with each, and consisting of a first pipe section; a second pipe section disposed at substantially 90° with respect to said first pipe section and forming a square elbow therewith; and a third pipe section substantially parallel to said first pipe section and disposed at substantially 90° with respect to said second pipe section and forming a square elbow therewith; said first and third pipe sections disposed in a substantially common plane that is between horizontal and about ± 10° from horizontal.

8. Apparatus as recited in claim 7 wherein said first, second, and third pipe sections are of substantially the same diameter D, and wherein the distance between the centerline of said first pipe section and said third pipe section is substantially 1 to 4 D.

9. Apparatus as recited in claim 7 wherein the distance from the outer periphery of said first pipe section to the outer periphery of said third pipe section at a point thereof closest to said first pipe section is about $\frac{3}{4}$ inch - 1 inch.

* * * * *